June 16, 1959  HANS-JOACHIM M. FÖRSTER  2,890,601
SPEED CHANGE TRANSMISSION
Filed Jan. 23, 1956  2 Sheets-Sheet 1

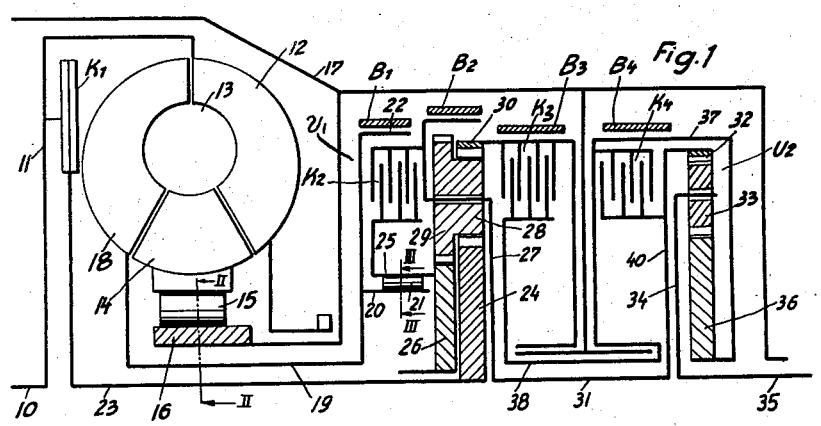

Fig.1

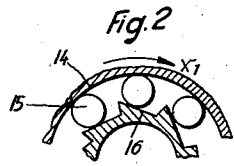

Fig.2

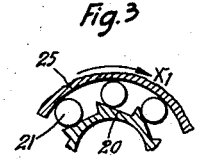

| | | Condition "UP Hill" | | | | | | | | | | Condition "Normal" | | | | | | | |
|---|---|---|---|---|---|---|---|---|---|---|---|---|---|---|---|---|---|---|---|
| | K₁ | K₂ | K₃ | K₄ | B₁ | B₂ | B₃ | B₄ | Ratio | | K₁ | K₂ | K₃ | K₄ | B₁ | B₂ | B₃ | B₄ | Ratio |
| hydr.1Sp | O | O | O | O | O | O | + | + | 7:1 | | | | | | | | | | |
| mech.2" | + | O | O | O | O | O | + | + | 4,25:1 | hydr.1Sp. | O | O | O | + | O | O | + | O | 4,25:1 |
| " 3." | + | O | O | + | O | O | + | O | 2,6:1 | mech.2." | + | O | O | + | O | O | + | O | 2,6:1 |
| " 4." | + | + | O | O | O | O | O | + | 1,6:1 | " 3." | + | + | O | O | O | O | O | + | 1,6:1 |
| " 5." | + | + | O | + | O | O | O | O | 1:1 | " 4." | + | + | O | + | O | O | O | O | 1:1 |
| hydr. R | O | O | + | O | O | + | O | O | 7:1 | hydr. R | O | O | + | O | O | + | O | O | 7:1 |

Inventor
HANS-JOACHIM M. FÖRSTER
BY Dicke and Craig
ATTORNEYS

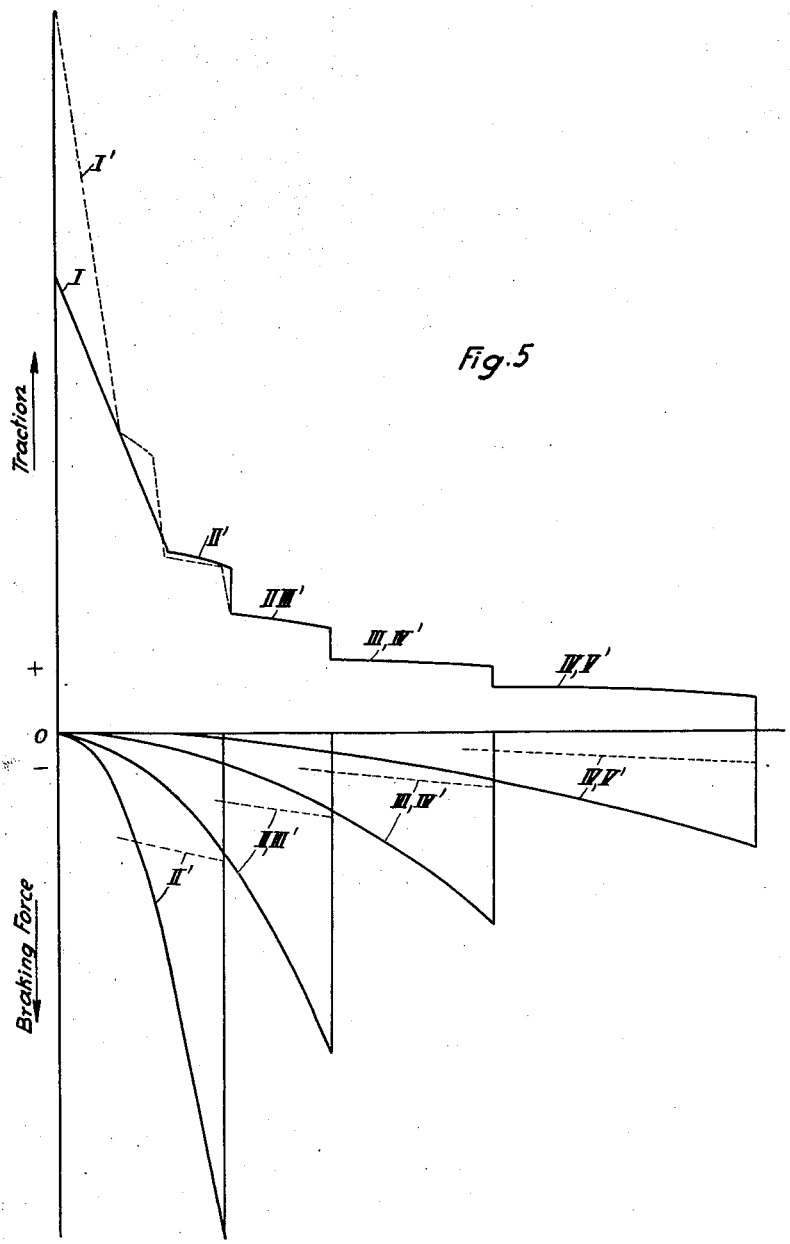

United States Patent Office 2,890,601
Patented June 16, 1959

2,890,601

SPEED CHANGE TRANSMISSION

Hans-Joachim M. Förster, Stuttgart-Bad Cannstatt, Germany, assignor to Daimler-Benz Aktiengesellschaft, Stuttgart-Unterturkheim, Germany Application January 23, 1956, Serial No. 560,647

Claims priority, application Germany January 27, 1955

8 Claims. (Cl. 74—688)

The present invention relates to a speed change transmission of the type in which a hydrodynamic power transfer device, such as a torque converter or a hydrodynamic clutch, is interposed between the driving shaft and a gearing having a plurality of ratios of transmission, mechanical motion-transmitting means being provided to by-pass the hydrodynamic device when the gearing is set to certain ratios of transmission.

It is the object of the present invention to improve the efficiency of the hydrodynamic power transfer device utilizing the same to brake the driven shaft thus enabling the speed change transmission to be operated in a very economical manner. More particularly, it is an object of the present invention to utilize the hydrodynamic device for applying a braking torque to the driven shaft irrespective of the ratio of transmission set up in the gearing and to eliminate the necessity of providing complicated control means for controlling such braking operation.

Finally, it is an object of the present invention to minimize the risk that the utilization of the engine for braking purposes during coasting of the vehicle might result in excessive speed of the engine subjecting same to undue stress.

Further objects of the present invention will appear from a detailed description of a preferred embodiment thereof following hereinafter, it being understood that the terms and phrases used in such description have been chosen for the purpose of illustrating the invention rather than that of restricting or limiting the same. The features for which patent protection is sought will be pointed out in the claims. In the drawings:

Fig. 1 is a diagrammatic sectional view of the transmission, the upper half of the section being shown only, as the lower half is symmetrical thereto and, therefore, is deemed dispensable herewith;

Fig. 2 is a partial diagrammatic section taken along the line II—II of Fig. 1 illustrating a free-wheeling clutch bracing the guide vane rotor of the hydrodynamic device against the housing;

Fig. 3 is a partial section taken along the line III—III of Fig. 1 to illustrate a free-wheeling clutch connecting the turbine wheel of the hydrodynamic device with the gearing;

Fig. 4 is a table illustrating the control of the transmission and showing which clutches and brakes should be engaged and disengaged to set up predetermined ratios of transmission and Fig. 5 is a graph illustrating the traction and the braking force in dependence on the speed of the driven shaft.

The novel speed change transmission illustrated in Fig. 1 comprises a driving shaft 10, a hydrodynamic power transfer device composed of an impeller 12 connected to the driving shaft 10, of a turbine wheel 18, and of means conducting a liquid for circulation through said impeller and said turbine wheel, such means including a guide vane rotor 14, said transmission further comprising a driven shaft 35, a gearing having a plurality of trains of gears selectively connecting the turbine wheel 18 to the driven shaft 35 at different ratios of transmission, and mechanical motion-transmitting means including a clutch K1 having one clutch member connected to the driving shaft 10 and the other clutch member connected to the gearing. These mechanical motion-transmitting means are adapted, when rendered active by engagement of the clutch K1, to by-pass the hydrodynamic power transfer device in the transfer of power from the driving shaft 10 to the driven shaft 35. However, the mechanical motion-transmitting means may be rendered inactive by disengagement of the clutch K1 whereby the power will be transferred from shaft 10 to shaft 35 by the hydrodynamic action exerted upon the turbine wheel 18 by the liquid put in circulation by the impeller 12.

In the embodiment illustrated, a drum 11, which may act as a flywheel, is fixed to the driving shaft 10 which may be the shaft of an engine of a motor vehicle. The drum 11 is rigidly connected with the impeller 12. The rotor 14 carrying guide vanes is connected with a stationary supporting ring 16 by a one-way locking device formed by a plurality of clamping rollers 15 inserted in pockets formed by teeth of ring 16 and the smooth internal cylindrical surface of the rotor 14, the teeth having slanting sides engaging the clamping rollers 15 in a known manner. The clamping rollers 15 are operative to permit the rotor 14 to freely rotate in forward direction of rotation indicated by the arrow $x1$ in Fig. 2, but to lock the rotor against rotation in the opposite direction.

The turbine wheel 18 is rigidly connected by a hollow shaft 19 with an annular clutch member 20 of a free-wheeling clutch 21 and with a brake drum 22 of a brake B1 which is diagrammatically illustrated as comprising a brake strap.

Preferably, each train of gears of the gearing which selectively connects the turbine wheel 18 to the driven shaft 35 at different ratios of transmission is formed by an epicyclic transmission composed of at least three elements mounted for rotation about a common axis. The hollow shaft 19 surrounds a shaft 23 which connects one section of the by-pass clutch K1 to the first element 24 of the first epicyclic transmission U1, the other section of the clutch K1 being rigidly connected to the drum 11. The first element 24 of the epicyclic transmission U1 constitutes the inner sun gear thereof. The transmission further comprises as the second element a second sun gear 26 mounted for free rotation on the shaft 23 and, as the third element of the transmission U1, a planetary gear carrier 27 fixed to a shaft 31 which is mounted coaxially to the shafts 10, 23 and 35. The planetary gear carrier 27 carries a plurality of planetary gears each having a set of gear teeth 28 meshing with sun gear 24 and a second set of gear teeth 29 being of larger pitch diameter than the gear teeth 28 and meshing with sun gear 26. Moreover, the transmission U1 includes a fourth element formed by an internal gear 30 surrounding the sun gear 24 in spaced relationship thereto and being in permanent mesh with the gear teeth 28 of the planetary gears. A clutch member 25 which surrounds clutch member 20 and cooperates with free-wheeling clutch rollers 21 disposed thereby between is rigidly attached to the sun gear 26. The free-wheeling clutch 20, 21, 25 is so designed that it affords the turbine wheel 18 and shaft 19 freedom to lag behind the sun gear 26 when the latter is driven through clutch K1, shaft 23 and gears 24, 28, 29. Therefore, the free-wheeling clutch may transfer a driving torque from the turbine wheel 18 through the hollow shaft 19, the clutch member 20, the rollers 21 and the clutch member 25 to the sun gear 26 driving the latter in the direction of the arrow x1 shown in Fig. 3, but permits the sun gear 26, when the latter is driven by a couple transferred through the by-pass clutch K1, to overtake the clutch member 20.

A locking clutch K2, which is preferably formed by a multi-disk clutch of customary design, is axially disposed between the epicyclic transmission U1 and the hydrodynamic power transfer device 12, 14, 18 and is radially disposed between the overrunning clutch 20, 25 and the brake B1. This locking clutch is adapted to clutch the elements 27 and 26 of the epicyclic transmission U1 to each other to thereby lock the transmission U1 for rotation of its elements 24, 26, 27, and 30 in unison. For this purpose, an inner set of disks of the clutch K2 is mounted for common rotation with the clutch member 25 and the sun gear 26 fixed thereto and is interleaved between the outer set of disks mounted for common rotation with the planetary gear carrier 27 and with a brake drum connected thereto forming part of a brake B2.

The brake B2 when put in operation will arrest the planetary gear carrier 27 holding the same stationary with respect to the housing of the same. The forth element 30 of the transmission U1 is rigidly connected with a brake drum forming part of a brake B3 and may be arrested by actuation of the latter.

The third element of the first epicyclic transmission, to wit the planetary gear carrier 27, is connected by an axially disposed shaft 31 and a suitable disk 40 with the second element 32 of the second epicyclic transmission U2, such second element in the embodiment shown being formed by an internal gear 32 meshing with a plurality of planetary gears 33 carried by a planetary gear carrier 34 which constitutes the first element of the transmission U2 and is fixed to the driven shaft 35. The third element of the transmission U2 is formed by a sun gear 36 meshing with the planetary gears 33. The shaft 35 may be geared to the wheels of a motor vehicle through the intermediary of a differential transmission.

From the foregoing explanation it will appear that shaft 31 constitutes the output shaft of the first transmission U1 and the input shaft of the second transmission U2.

The sun gear 36 is rigidly connected with one end wall of a cylindrical drum 37 the opposite end wall of which is secured to a hollow shaft 38 surrounding shaft 31. The shaft 38 is adapted to be clutched to the gear element 30 of the transmission U1 through the intermediary of a disengageable clutch K3 which is preferably formed by a conventional multi-disk clutch having two interleaved sets of disks, one set being fixed to the brake drum of the brake B3 and the other set being fixed to an annular member rigidly connected to the hollow shaft 38. The drum 37 constitutes a brake drum of a brake B4 and, therefore, may be held stationary relative to the transmission housing. Moreover, the second epicyclic transmission U2 is provided with a lock clutch K4 adapted to rigidly clutch the gear element 32 to the gear element 36. Preferably, the lock clutch K4 comprises two interleaved sets of disks, one set being fixed to an end wall of cylindrical drum 37 and the other set being fixed to disk 40.

Suitable electrical, hydraulic or pneumatic actuating means are associated with the clutches K1, K2, K3, K4 and with the brakes B2, B3 and B4 and are controlled by a ratio selector so as to be individually engaged or disengaged during the operation of the transmission. As such actuating means and such ratio selector are well known in the art, they have neither been shown nor described. Preferably, the ratio selector is of an automatic type being automatically set in dependence on the speed of the vehicle and the driving torque produced by the engine to any one of a plurality of positions, being adapted in said positions to determine different ratios of transmission by selective engagement and disengagement of the various clutches and brakes, except for brake B1, in the manner illustrated in Fig. 4. More particularly, the ratio selector is settable to an "up hill"-condition and a "normal"-condition. In one of said conditions it is operative to select one group of ratios listed in one of the columns and in the other one of said conditions the selector is operative to select another group of ratios listed in another column. Moreover, the different columns in Fig. 4 show whether the individual clutches or brakes are engaged, as indicated by the character +, or are disengaged, as indicated by the character o, when the ratio selector is set to the different positions coordinated to the various ratios. The selector can be set up to the different conditions by a range slide valve and may be set up for the different ratios under each condition by a pressure step regulator such as disclosed in the pending patent applications Serial No. 326,215, filed December 16, 1952, and Serial No. 396,196, filed December 4, 1953.

As will appear from Fig. 4, the second, third and fourth forward ratio and the reverse ratio under condition "normal" require the same control of the brakes and clutches as the third, fourth and fifth forward ratio and the reverse ratio respectively under the condition "up hill." The setting up of the transmission to these ratios requires engagement of the by-pass clutch K1 so that power is transmitted by purely mechanical elements. In the reverse ratio R the by-pass clutch K1 is disengaged so that power is transmitted to shaft 35 in reverse direction through the hydrodynamic device 13 and the free-wheeling clutch 21.

When conditioned "normal," the transmission may be set up to an additional hydraulical ratio, to wit the first speed ratio, in which power is transmitted through the hydrodynamic device. When conditioned "up hill," the transmission may be set up to a mechanical second speed ratio provided in addition to the hydraulic first speed ratio which is a particularly high ratio of transmission. More particularly, the transmission, when set up as stated hereinafter, will transfer the power through the elements listed hereinafter.

Condition "up hill," first speed ratio: 10, 12, 18, 19, 21, 26 (30 arrested by brake), 29, 28, 27, 31, 32 (36 arrested by brake), 33, 34, 35.

Condition "up hill," second speed ratio: 10, K1, 23, 24 (30 arrested by brake), 28, 27, 31, 32 (36 arrested by brake), 33, 34, 35.

Condition "normal," first speed ratio: 10, 12, 18, 19, 21, 26 (30 arrested by brake), 29, 28, 27, 31, U2 (locked by lock clutch K4), 35.

Condition "up hill," third speed ratio and condition "normal," second speed ratio: 10, K1, 23, 24 (30 arrested by brake), 28, 27, 31, U2 (locked by lock clutch K4), 35.

Condition "up hill," fourth speed ratio and condition "normal," third speed ratio: 10, K1, 23, U1 (locked by lock clutch K2), 27, 31, 32 (36 arrested by brake), 33, 34, 35.

Condition "up hill," fifth speed ratio and condition "normal," fourth speed ratio: 10, K1, 23, U1 (locked by lock clutch K2), 31, U2 (locked by lock clutch K4), 35.

Condition "up hill" reverse speed ratio and condition "normal," reverse speed ratio: 10, 12, 18, 19, 21, 26 (27 arrested by brake B2), 29, 28, 30, K3, 38, 37, 36 (32 arrested by brake B2), 33, 34, 35.

When the transmission is set up to any one of the "mechanical" forward speed ratios in which the by-pass clutch K1 is engaged, either brake B3 or clutch K2 is in engaged condition. Engagement of brake B3 causes the sun gear 26 to be rotated by an overdrive and to thus overtake the sun gear 24 and the impeller 12 clutched thereto whereby the free-wheeling clutch 21 is disengaged. Such disengagement of free-wheeling clutch 21 also occurs when the epicyclic transmission U1 is locked by engagement of clutch K2 because the slippage in the hydroynamic device 13 causes the inner clutch member 20 to rotate at a lower speed in the direction x1 than the outer clutch member 25.

Normally, the brake B1 is disengaged, no matter what the ratio of transmission might be. The brake B1 is controlled by the brake pedal of the vehicle. When the operator engages brake B1 by actuation of the brake pedal while the transmission is set to any one of the mechanical speed ratios in which clutch K1 is engaged, a hydraulic braking couple is exerted on shaft 23 clutched to the impeller 12 because the turbine wheel 18 is retarded by the brake B1. This braking couple is transferred through the gearing to the driven shaft 35. In this operation, the impeller 12 driven by the coasting vehicle and thus rotating at a speed depending on the ratio of transmission set up must overcome the hydraulic couple exerted by the arrested turbine wheel 18 while the hydrodynamic device is slipping, the braking energy retarding the vehicle being annihilated in the hydrodynamic device. Since the impeller 12 is rigidly connected with the engine shaft 10, the braking couple produced by the engine is added to the braking couple exerted by the hydrodynamic device. If desired, however, an additional clutch may be interposed between the clutch K1 and the driving shaft 10 or between the clutch K1 and the impeller 12, such additional clutch affording a possibility to optionally eliminate the braking effect of the engine and/or of the hydrodynamic device.

The hydrodynamic brake B1 may be actuated at any time when the transmission is set up to any one of the mechanical ratios of transmission, that is to say to the second, third, fourth, or fifth speed ratio, when conditioned "up hill," and to the second, third, or fourth speed ratio, when conditioned "normal." The graphs shown in Fig. 5 illustrate the operation of the transmission in dependence on the speed of the driven shaft or the speed of travel where the transmission is employed in a motor vehicle. The upper portion of the graph above the abscissa shows the traction produced by the wheels when driven by the engine, whereas the lower portion shows the braking force in kg. The ratios of transmission for the "normal"-condition of the transmission are designated I through IV. The ratios of transmission for the "up hill"-condition are designated I' through V'.

The wheel traction produced under full engine power with the transmission conditioned to "normal" is indicated by a full line, whereas the wheel traction produced under full engine power with the transmission conditioned to "up hill" is indicated by a broken line. As shown in Fig. 5, a continuously variable traction will be produced with the hydraulic transmission for starting the vehicle, as indicated by the lines I ("normal") and I' ("up hill"), whereas with the transmission set to the other ratios the graph is step-shaped representing the traction varying intermittently with the change of the ratios. Moreover, by the full parabolical lines the diagram illustrates the braking force which may be produced by means of the hydraulic braking effect, whereas the braking force produced by the engine is diagrammatically indicated by the broken lines. As will appear from Fig. 5, above a certain driving speed the braking effect produced by the hydrodynamic device is larger than that produced by the engine and increases rapidly with the rate of travel of the vehicle. Hence, the risk is minimized that the engine might be subjected to excessive stress by the use for braking purposes during the coasting of the vehicle. This is an important advantage of the present invention.

In the embodiment of the invention which Fig. 4 illustrates, the successive ratios of transmission constitute a geometrical row comprising the members 1, 1.6, 2.6, 4.2, 5 and 7, the quotient of successive members amounting substantially to 1.6. However, any other desired ratios may be chosen.

From the foregoing description it will appear that the present invention avoids the disadvantage of prior transmissions having hydrodynamic torque converters that, as a rule, a hydraulic braking operation is restricted to two speeds and that the energy annihilated in the hydraulic torque converter under maximum engine speed conditions is far in excess of the permissible limits and, moreover, in excess of the normal limits of the cooling capacity of the engine radiator. Moreover, the present invention avoids the disadvantage that the hydraulic braking operation requires a special program control.

The novel transmission affords the possibility of utilizing the torque converter or hydrodynamic clutch for braking purposes with the greatest possible efficiency. It is an essential feature of the present invention that the turbine wheel, such as 18, may be disconnected from the gearing, for instance by the provision of a free-wheeling clutch, such as 20, 21, 25, and may be arrested by a brake, such as B1, whereby the turbine wheel causes the hydrodynamic device to produce a braking torque applied through the by-pass clutch, such as K1, from the impeller 12 to the gearing via shaft 23. This braking operation may be controlled by operating the brake B1 independently of the gear-shifting operation although, if desired, a common member may be employed to select the desired ratio of transmission of the gearing and to apply the brake B1 to thereby initiate the hydrodynamic braking effect.

Preferably, the clutch connecting the turbine wheel, such as 18, with the gearing is formed by a free-wheeling clutch, such as 20, 21, 25. As a result, the driving couple is applied by the turbine wheel 18 through such clutch to the gearing, when the by-pass clutch K1 is disengaged. Upon engagement of the by-pass clutch K1, however, the transfer of a driving couple from the turbine wheel to the gearing will be interrupted.

Owing to the provision of the additional brake, such as B1, for arresting the turbine wheel, such as 18, during forward travel of the vehicle, the hydrodynamic device may develop a high braking energy irrespective of the instantaneous speed of the engine, such energy corresponding to a slippage up to 100 percent. This braking energy is transferred from wheels of the coasting vehicle through the gearing of the transmission and through the by-pass clutch into the hydrodynamic device and is utilized in an efficient manner by the vanes cooperating with the circulating liquid. This hydrodynamic braking operation may be put into effect with the transmission set to any mechanical speed ratio, i.e. any ratio involving engagement of the by-pass clutch K1. Hence, the driver may avail himself of the hydraulic braking facilities with a number of ratios of transmission thus meeting the requirements of up and down grades of the road in a superior manner. More particularly, when the transmission is set to any one of the mechanical speed ratios, the driver may brake the vehicle either by disengaging brake B1 and thereby using the braking couple produced by the engine only or by engaging brake B1 thereby using the braking couple produced by both the engine and the hydrodynamic device. Any control- or gear-shifting program that may be provided for forward travel or for pure engine braking may be retained with the maximum engine speed being limited without risking the hydrodynamic device taking up excessive braking energy.

This advantageous effect is the more favorable the larger the number of the mechanical ratios of transmission will be in which the vehicle may be braked by the hydrodynamic device through the by-pass clutch alone or, additionally, through the engine.

Another important feature of the present invention resides in the provision of two or more control conditions, such as "up hill" and "normal," when an automatic speed ratio selector is employed, such selector selecting one of a number of speeds, when the transmission is set to one condition, and selecting one of another number of speeds, when the transmission is set to another condition. More particularly, where two such conditions are provided including the same mechanical ratios, one of the conditions, such as "normal," includes one low hydraulic ratio while the other condition, such as "up hill," includes an extremely low mechanical ratio and a still lower hydraulic ratio. By the use of such a number of mechanical speed ratios by-passing the hydrodynamic device the operation of the transmission is rendered very economical. Experience has shown that the fuel consumption, particularly of trucks and similar vehicles, is unduly increased by the use of hydrodynamic torque converters or clutches. By restricting the function of such hydrodynamic devices to a single ratio of transmission in each condition, the reduction of the efficiency may be restricted to a minimum in that the hydrodynamic device is used in the starting operation only, whereas it is by-passed in all other speeds. At the same time the hydrodynamic device may be utilized for braking the vehicle provided that the transmission is set to any one of the mechanical speed ratios in which the by-pass clutch is engaged. This will considerably enhance the economy and reliability of the operation of the vehicle. Preferably, the gearing settable to a plurality of different ratios of transmission is composed of a first and a second epicyclic transmission each composed of at least three elements mounted for rotation about a common axis, the first element, such as 24, of the first epicyclic transmission, such as U1, being adapted to be clutched to the driving shaft, e.g. by the by-pass clutch K1, a first element, such as 34, of the second epicyclic transmission U2 being connected to the driven shaft, said speed change transmission further comprising a one-way clutch, such as 20, 21, 25, connecting a second element, such as 26, of the first epicyclic transmission to the turbine wheel, the third element, such as 27, of the first epicyclic transmission being connected with the second element, such as 32, of the second epicyclic transmission U2. With this arrangement the necesssity is avoided to provide an additional set of planetary gears for the reverse drive.

The hydrodynamic device is preferably formed by a torque converter, but it may be equally formed by a simple hydrodynamic clutch.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Speed change transmission comprising a driving shaft, a hydro-dynamic power transfer device composed of an impeller connected to said driving shaft, of a turbine wheel and of means conducting a liquid circulating through said impeller and said turbine wheel, a driven shaft, a gearing including a plurality of trains of gears selectively connecting said turbine wheel to said driven shaft at different ratios of transmission, mechanical motion-transmitting means connected to said driving shaft and to said gearing and including a clutch which, when engaged, by-passes said hydro-dynamic power transfer device, a free-wheeling clutch interposed between one of said trains of said gearing and said turbine wheel in a manner affording said turbine wheel freedom to lag behind said train when the latter is driven through said first-mentioned clutch, said free-wheeling clutch being, therefore, operative, when said first-mentioned clutch is disengaged, to transfer driving power from said turbine wheel to said gearing and, when said first-mentioned clutch is engaged, to interrupt the transmission of power from said turbine wheel to said gearing, and a brake connected with and operative to act on said turbine wheel to thereby retard same with respect to said impeller applying a hydraulically produced braking torque to said driven shaft through said mechanical motion-transmitting means, when the same is active, and through said gearing to said driven shaft.

2. Speed change transmission as claimed in claim 1 further comprising speed change means for selecting any one of said different ratios of transmission, said brake being operable independently of such speed change means.

3. Speed change transmission as claimed in claim 1 in which said gearing includes a first and a second epicyclic transmission, each having an input shaft and an output shaft and being composed of three elements mounted for rotation about a common axis, the output shaft of said first transmission constituting the input shaft of said second transmission, the first element of said first epicyclic transmission being adapted to be clutched to said driving shaft, a first element of said second epicyclic transmission being connected to said driven shaft, said speed change transmission further comprising a one-way clutch connecting a second element of said first epicyclic transmission to said turbine wheel, the third element of said first epicyclic transmission being connected with the second element of said second epicyclic transmission.

4. Speed change transmission as claimed in claim 3 further comprising a brake cooperating with said third element of said first epicyclic transmission.

5. Speed change transmission as claimed in claim 4 in which said first epicyclic transmission includes a fourth rotary element adapted to be clutched to said second epicyclic transmission for operation of said driven shaft in reverse, said speed change transmission further comprising a brake adapted to cooperate with said fourth element.

6. Speed change transmission as claimed in claim 5 in which each of said epicyclic transmissions is provided with a locking clutch adapted to clutch two of said elements thereof to each other to thereby lock said epicyclic transmission for common rotation of its elements in unison.

7. Speed change transmission as claimed in claim 6 in which said locking clutch of said first epicyclic transmission is axially disposed between the latter and said hydrodynamic power transfer device.

8. Speed change transmission as claimed in claim 1 in which said free-wheeling clutch comprises a driving member connected to said turbine wheel for common rotation, a driven member connected to said gearing, the latter including a set of meshing gears establishing a motion-transmitting connection between said first-mentioned clutch and said driven member and enabling said driven member to overtake said driving member rotating faster than the latter, when said first-mentioned clutch is engaged.

References Cited in the file of this patent

UNITED STATES PATENTS

| 2,695,533 | Pollard | Nov. 30, 1954 |
| 2,701,480 | Seybold | Feb. 8, 1955 |
| 2,738,689 | Dodge | Mar. 20, 1956 |

FOREIGN PATENTS

| 726,448 | Great Britain | Mar. 16, 1955 |